(12) United States Patent
Le Meur et al.

(10) Patent No.: US 8,200,045 B2
(45) Date of Patent: Jun. 12, 2012

(54) IMAGE PROCESSING METHOD

(75) Inventors: Olivier Le Meur, Talensac (FR);
Jean-Claude Chevet, Betton (FR);
Guillaume Courtin, Ferce (FR)

(73) Assignee: Thomson Licensing,
Issy-les-Moulineaux (FR)

( * ) Notice: Subject to any disclaimer, the term of this patent is extended or adjusted under 35 U.S.C. 154(b) by 1164 days.

(21) Appl. No.: 12/012,668

(22) Filed: Feb. 5, 2008

(65) Prior Publication Data
US 2008/0212897 A1    Sep. 4, 2008

(30) Foreign Application Priority Data

Feb. 7, 2007    (FR) ...................................... 07 53106

(51) Int. Cl.
*G06K 9/36* (2006.01)
*G06K 9/32* (2006.01)

(52) U.S. Cl. ........................ 382/298; 382/276
(58) Field of Classification Search .................. 382/298
See application file for complete search history.

(56) References Cited

U.S. PATENT DOCUMENTS

| | | | | | |
|---|---|---|---|---|---|
| 4,977,602 | A | * | 12/1990 | Beato | 382/298 |
| 5,767,922 | A | * | 6/1998 | Zabih et al. | 348/700 |
| 6,611,613 | B1 | * | 8/2003 | Kang et al. | 382/118 |
| 7,171,058 | B2 | * | 1/2007 | Luo | 382/264 |
| 7,177,488 | B2 | * | 2/2007 | Berkner et al. | 382/298 |
| 7,365,757 | B1 | * | 4/2008 | Callway et al. | 345/629 |
| 7,630,562 | B2 | * | 12/2009 | Gong et al. | 382/219 |
| 7,747,107 | B2 | * | 6/2010 | Avidan et al. | 382/298 |
| 2001/0041008 | A1 | * | 11/2001 | Kasutani | 382/218 |
| 2002/0191861 | A1 | | 12/2002 | Cheatle | |
| 2005/0025387 | A1 | | 2/2005 | Luo | |
| 2006/0093235 | A1 | * | 5/2006 | Takarada | 382/264 |
| 2006/0106816 | A1 | * | 5/2006 | Oisel et al. | 707/100 |
| 2006/0165283 | A1 | * | 7/2006 | DeWitt et al. | 382/173 |
| 2006/0195860 | A1 | * | 8/2006 | Eldering et al. | 725/19 |
| 2007/0047040 | A1 | * | 3/2007 | Ha | 359/24 |
| 2007/0206233 | A1 | * | 9/2007 | Koyama et al. | 358/462 |
| 2008/0044102 | A1 | * | 2/2008 | Ekin | 382/276 |

OTHER PUBLICATIONS

Xin Fan et al.: "Looking into Video Frames on Small Displays" Internet Citation Feb. 11, 2003 XP007903055 p. 247, line 1, p. 259, line 3.
Chen L-Q et al.: "A Visual Attention Model for Adapting Images on Small Displays" Multimedia Systems, ACM, New York, NY, US vol. 9, No. 4, Oct. 2003, pp. 353-364 XP001196335.
Search Report dated Sep. 28, 2007.

* cited by examiner

*Primary Examiner* — Michelle Entezari
(74) *Attorney, Agent, or Firm* — Myers Wolin, LLC

(57) ABSTRACT

The invention relates to an image processing method to generate, from a source image, an image of reduced size whose ratio between the width and the height is equal to a predetermined value, called reduced ratio. It comprises the following steps:
  selecting one rectangular image part in the source image, and
  extracting the rectangular image part to generate the reduced image.
According to an essential characteristic of the method, if the ratio between the width and height of the rectangular image part, called first ratio, is not equal to the reduced ratio, the width or the height of the rectangular image part is modified before the extraction step according to values of perceptual interest associated with each pixel of the source image in such a manner that the ratio between the width and the height of the modified rectangular image part, called second ratio, is equal to the reduced ratio.

9 Claims, 8 Drawing Sheets

IMAGE PROCESSING METHOD

1. SCOPE OF THE INVENTION

Figure 1:
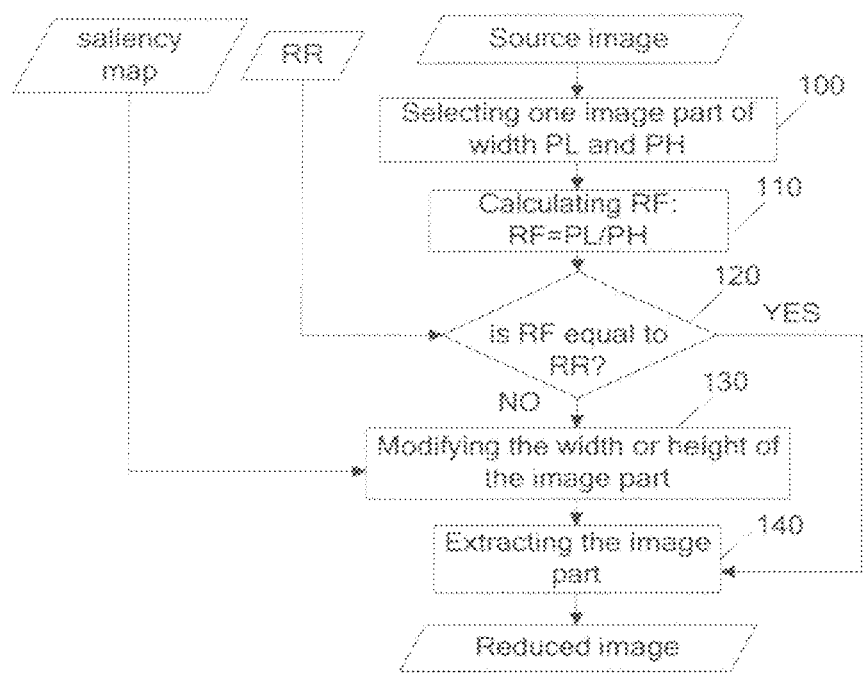

The invention relates to an image processing method to generate an image of reduced size from a source image.

2. PRIOR ART

For navigation applications in a set of fixed images or videos, it is useful to be able to display all the images of videos at a single glance. For this purpose, it is interesting to generate a reduced size version of each fixed image or each image of the videos so that said images or videos are displayed simultaneously on a same screen and are able to be compared easily. Likewise, for a broadcast application of a video content on a mobile appliance having a small sized screen, e.g. on a mobile phone, it is necessary to generate a reduced size version of each image of the video in order to display them on the small sized screen.

A method known to a person skilled the art to generate these reduced images or videos from a source image or video consists in subsampling said source image or video. In the case of a significant reduction in size some image parts are unusable by the user as they are too small.

3. SUMMARY OF THE INVENTION

The purpose of the invention is to compensate for at least one disadvantage of the prior art.

The invention relates to an image processing method to generate, from a source image, an image of reduced size whose ratio between the width and the height is equal to a predetermined value, called reduced ratio. It comprises the following steps:
  selecting one rectangular image part in the source image, and
  extracting the rectangular image part to generate the reduced image.

According to an essential characteristic of the invention, if the ratio between the width and height of the rectangular image part, called first ratio, is not equal to the reduced ratio, the width or the height of the rectangular image part is modified before the extraction step according to values of perceptual interest associated with each pixel of the source image in such a manner that the ratio between the width and the height of the modified rectangular image part, called second ratio, is equal to the reduced ratio.

According to a particular characteristic, if the first ratio is less than the reduced ratio, the width of the rectangular image part is increased by a first value to the right and by a second value to the left, the first and second values being determined according to the following steps:
  calculating a first increase such that the ratio between the increased width of the first increase and the height is equal to the reduced ratio,
  calculating a first average saliency value from the values of perceptual interest associated with the pixels of the additional image part obtained by increasing the width of the rectangular image part of the first increase to the right,
  calculating a second average saliency value from the values of perceptual interest associated with the pixels of the additional image part obtained by increasing the width of the rectangular image part of the first increase to the left,
  calculating the first value as being the product of the first increase and the ratio between the first average saliency value and the sum of the first and second average saliency values, called total average saliency value, and
  calculating the second value as being the product of the first increase and the ratio between the second average saliency value and the total average saliency value.

According to another particular characteristic, if the first ratio is greater than the reduced ratio, the height of the rectangular image part is increased by a first value upward and by a second value downward, the first and second values being determined according to the following steps:
  calculating a second increase of the height such that the ratio between the width and the height increased by the second increase is equal to the reduced ratio,
  calculating a first average saliency value from values of perceptual interest associated with the pixels of the additional image part obtained by increasing the height of the image part of the second increase upward,
  calculating a second average saliency value from values of perceptual interest associated with the pixels of the additional image part obtained by increasing the height of the image part of the second increase downward,
  calculating the first value as being the product of the second increase and the ratio between the first average saliency value and the sum of the first and second average saliency values, called total average saliency value, and
  calculating the second value as being the product of the second increase and the ratio between the second average saliency value and the total average saliency value.

According to a particular embodiment, wherein the source image belongs to a sequence of several images, the method is applied to each image of the sequence and comprises, after the modification step of the width or height of the rectangular image part of a current image, a temporal adaptation step of the rectangular image part consisting in moving at least one of the sides of the rectangular image part if the side is separated from the corresponding side of the rectangular image part of the image that precedes the current image by a distance greater than a predetermined threshold such that the distance is reduced.

According to another particular embodiment, wherein the source image belongs to a sequence of several images, the method is applied to each image of the sequence and comprises, after the modification step of the width or height of the rectangular image part of a current image, a temporal adaptation step of the rectangular image part consisting in moving all the sides of the rectangular image part if each side is separated from the corresponding side of the rectangular image part of the image that precedes the current image by a distance greater than a predetermined threshold such that the distances are reduced.

According to another particular embodiment, wherein the source image belongs to a sequence of several images, the method is applied to each image of the sequence and comprises, after the modification step of the width or height of the rectangular image part of a current image, a temporal adaptation step of the rectangular image part consisting in modifying at least one parameter of the rectangular image part among the following parameters: the height, width and coordinates of the centre such that the modified parameter is equal to the median value of the set of values comprising the corresponding parameters of the rectangular image parts of the N images preceding the current image and the N' images following the current image, with N and N' positive integers.

According to a particular characteristic, N=N'.

According to another particular characteristic, the sequence being divided into groups of images called shots, the N images preceding the current image and the N' images following the current image belong to the same shot as the current image.

Advantageously, if the ratio between the width and height of the temporally adapted rectangular image part is not equal to the reduced ratio, the temporal adaptation step is followed by a modification step of the width or the height of the temporally adapted rectangular image part according to the values of perceptual interest associated with each pixel of the current source image such that the ratio between the width and the height of the temporally adapted and modified rectangular image part is equal to the reduced ratio.

4. LIST OF FIGURES

Figure 2:
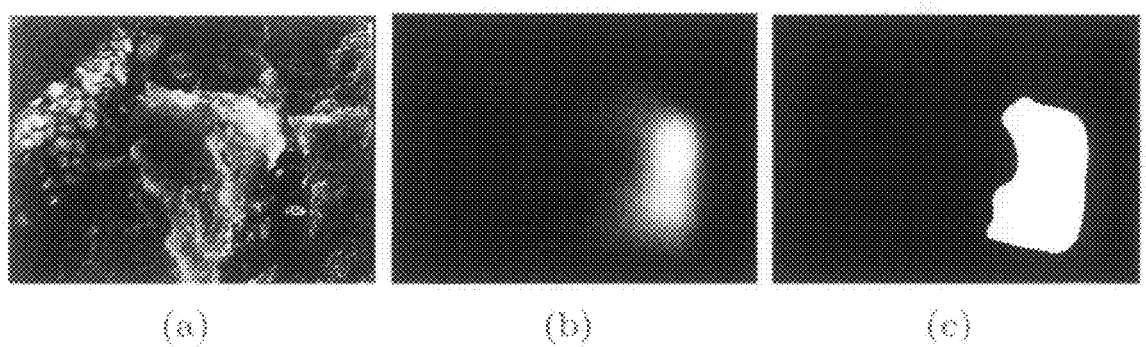
Figure 3:
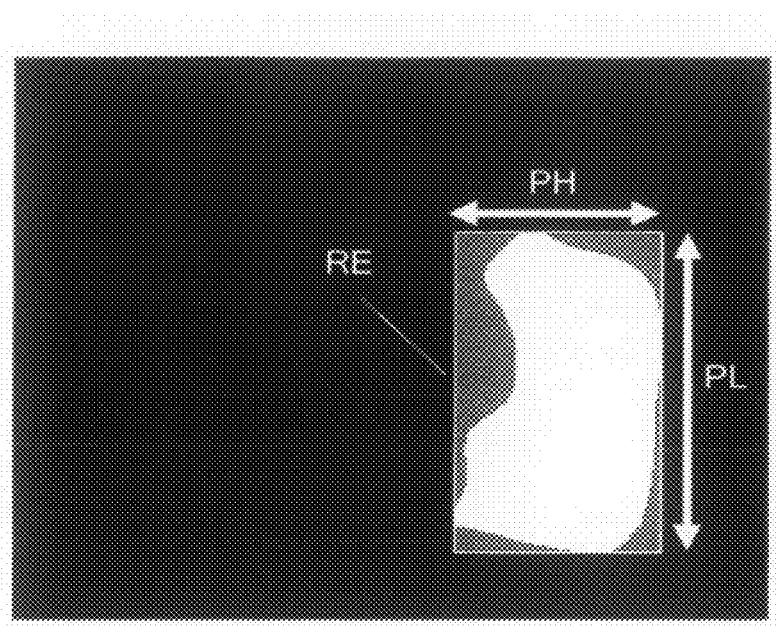
Figure 4:
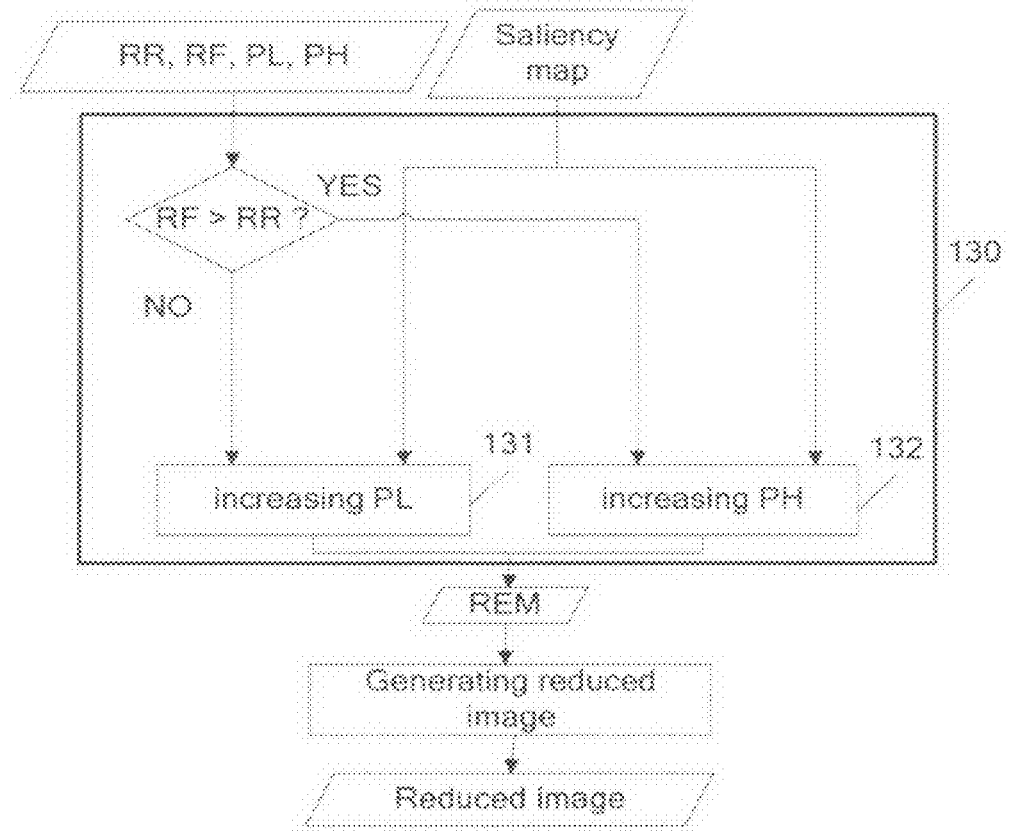
Figure 5:
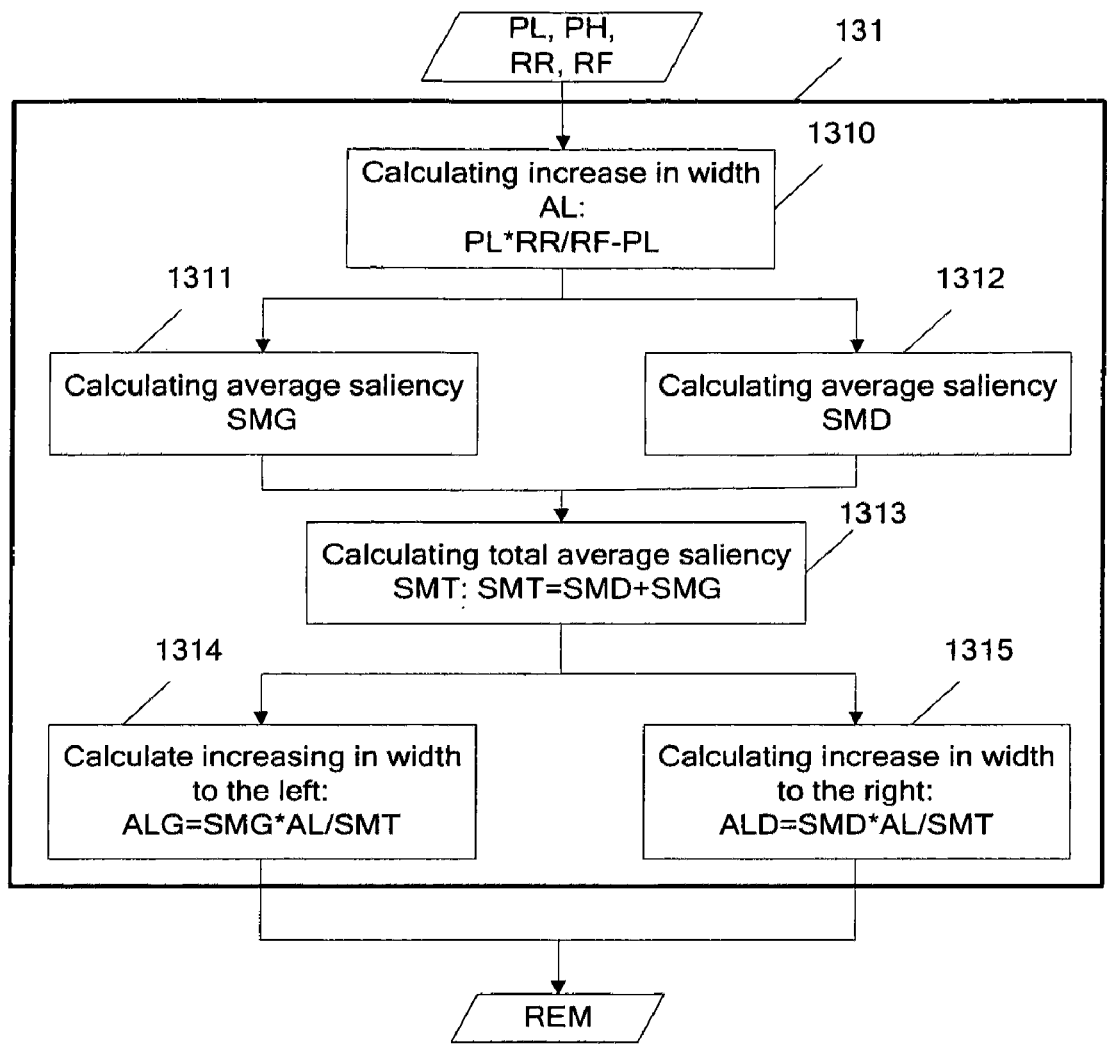
Figure 6:
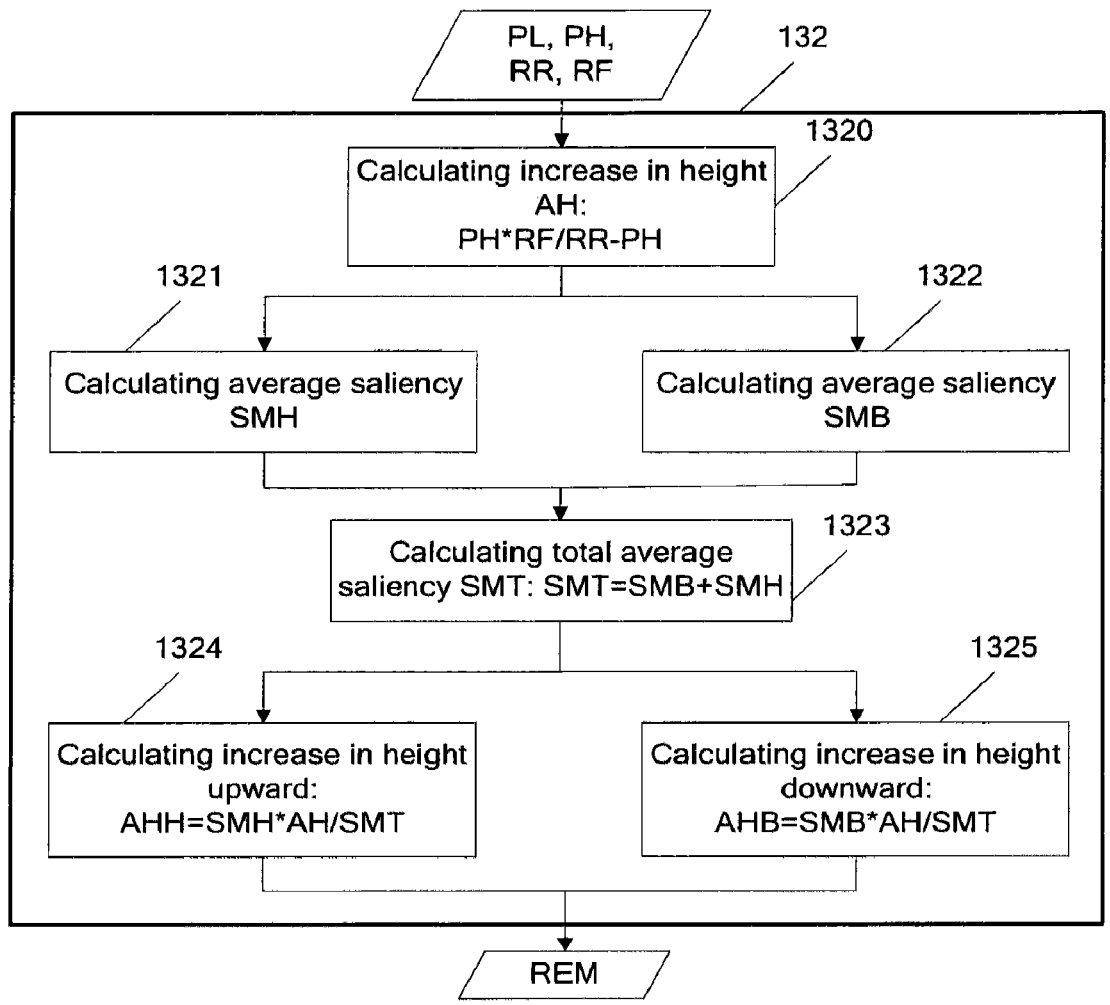
Figure 7:
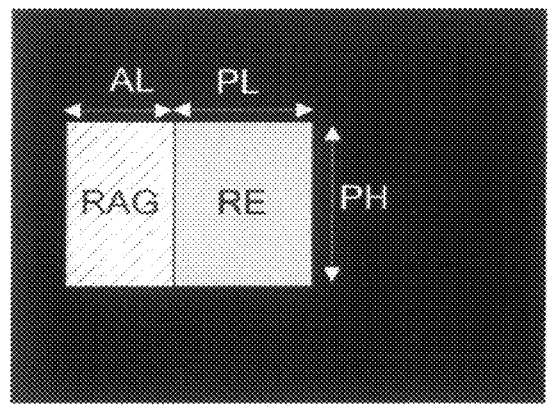
Figure 8:
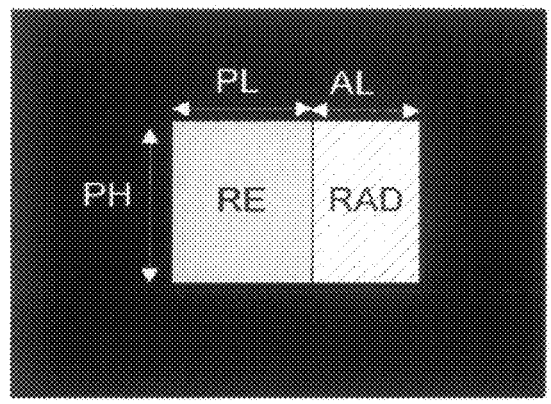
Figure 9:
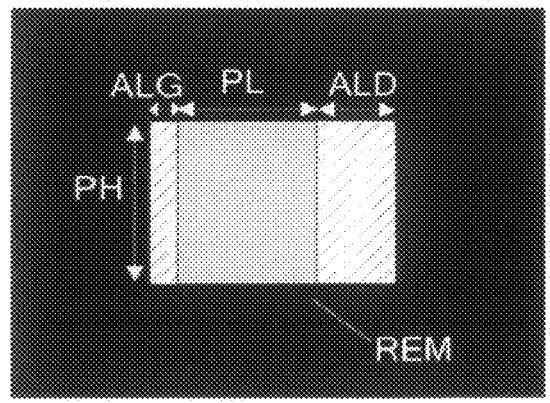
Figure 10:
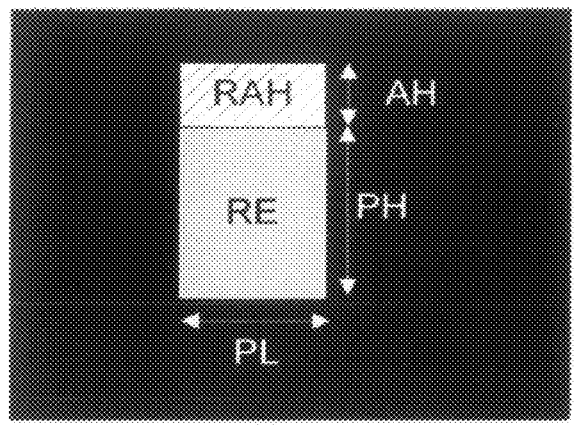
Figure 11:
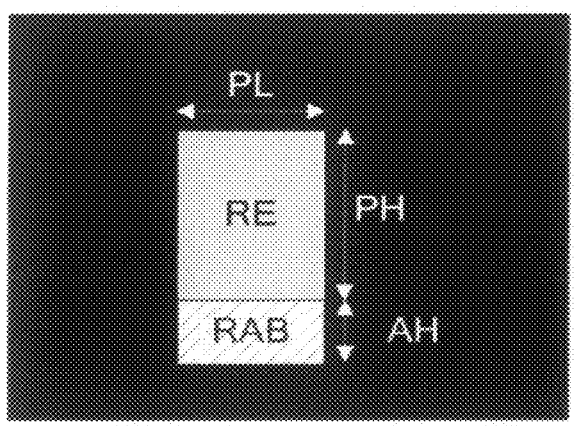
Figure 12:
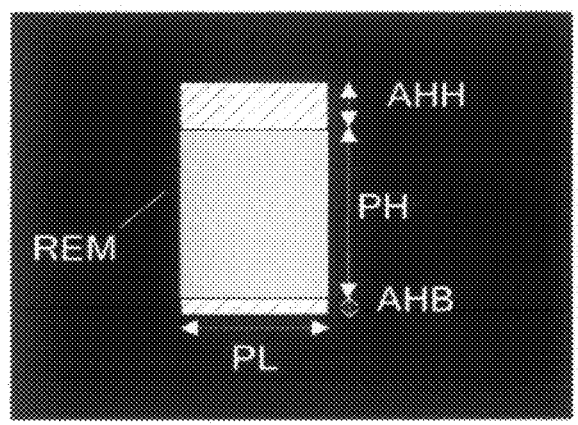
Figure 13:
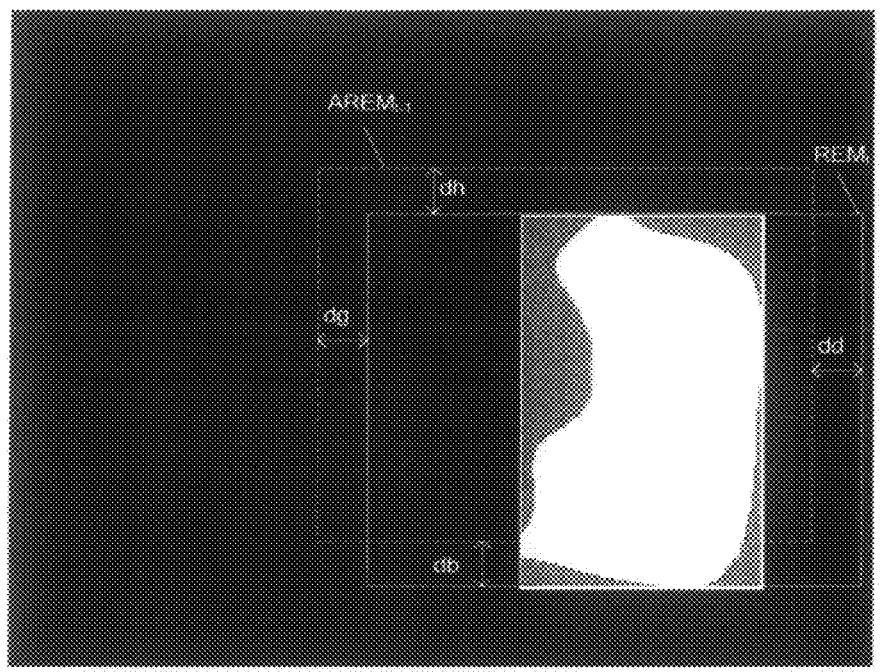
Figure 14:
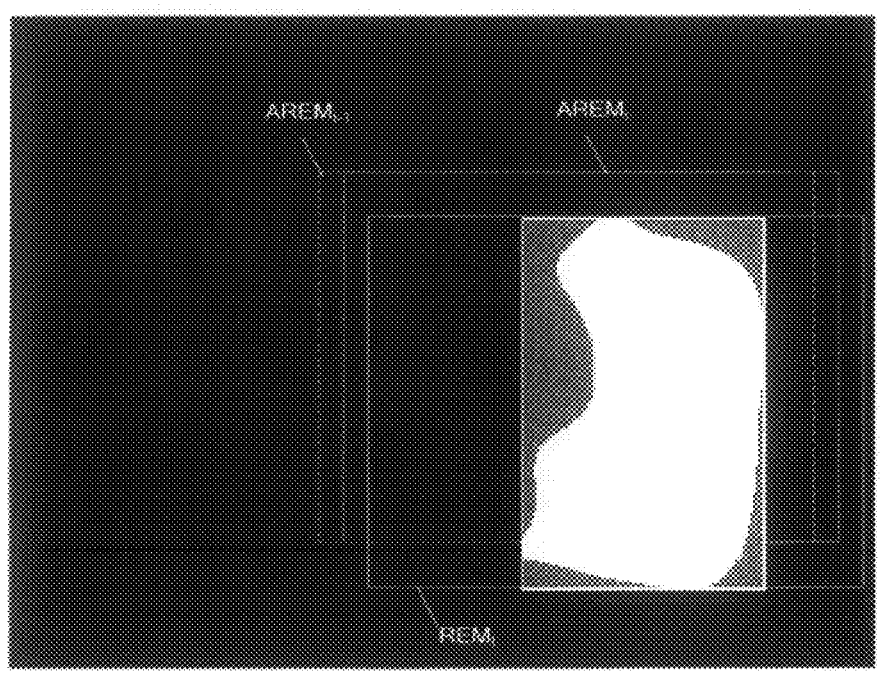
Figure 15:
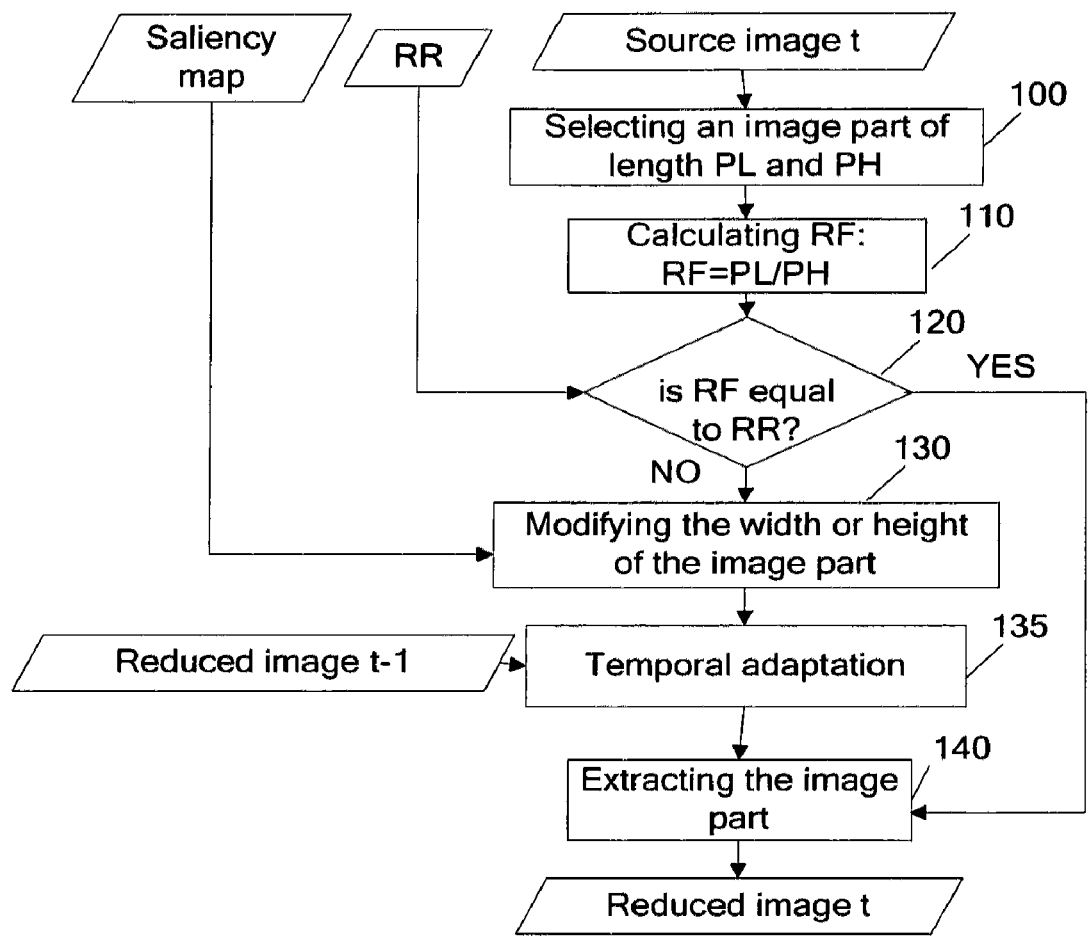

The invention will be better understood and illustrated by means of advantageous embodiments and implementations, by no means limiting, with reference to the figures attached in the appendix, wherein:

FIG. 1 illustrates the steps of the method according to a particular embodiment of the invention, FIG. 2 shows an image (a), an associated saliency map (b) and a binary map obtained by thresholding the saliency map (c), FIG. 3 shows a bounding box surrounding the salient zone of an image, FIG. 4 illustrates the steps of the method according to the invention, FIG. 5 illustrates the steps of the method according to the invention applied to increase the width of the bounding box, FIG. 6 illustrates the steps of the method according to the invention applied to increase the height of the bounding box, FIG. 7 shows an bounding box RE and an additional box RAG located to the left of the box RE, FIG. 8 shows an bounding box RE and an additional box RAD located to the right of the box RE, FIG. 9 shows an additional modified box REM according to the method of the invention, FIG. 10 shows an bounding box RE and an additional box RAH located above the box RE, FIG. 11 shows an bounding box RE and an additional box RAB located below the box RE, FIG. 12 shows an additional modified box REM according to the method of the invention, FIG. 13 shows the temporally adapted box $AREM_{t-1}$ associated with the image of index t−1 and the bounding box REM associated with the image of index t before the temporal adaptation, FIG. 14 shows the temporally adapted box $AREM_{t-1}$ associated with the image of index t−1 and the bounding boxes REM associated with the image of index t before and after the temporal adaptation, FIG. 15 illustrates the steps of the method according to another particular embodiment of the invention.

5. DETAILED DESCRIPTION OF THE INVENTION

The invention relates to a method for generating, from a source image, an image of reduced size whose ratio between the width and height is equal to a predetermined ratio, called reduced ratio and noted as RR. The invention described for an image can be applied to a sequence of images such as a video.

In reference to FIG. 1, the invention comprises a first selection step 100 of a rectangular part of the source image. Such a selection is advantageously carried out from data characterizing the perceptual interest of the pixels of the source image.

For this purpose, in reference to FIG. 2, a saliency map (FIG. 2(b)) associated with the source image (FIG. 2(a)) is binarised with a predetermined threshold in such a manner to identify the salient parts in the source image, i.e. of which the perceptual interest is high. The binary map generated (FIG. 2(c)) associates a first value (e.g. zero) with each pixel of the source image if the associated saliency value of said pixel is lower than the predetermined threshold or a second value (e.g. 255) otherwise. In reference to FIG. 3, a bounding box RE is positioned in the source image such that it surrounds the zone of the source image constituted by the pixels to which the second value is associated. The bounding box delimits the image part selected. A saliency map is obtained for example by applying the method described in the patent application EP03293216.2 (publication 1544792). Such a map associated a saliency value noted $s_p$ with each pixel P of the source image. The selection of the image part can be made according to any other method. According to a variant, it is carried out manually by a human operator. Such a zone is also known in the prior art under the name of area or region of interest.

Step 110 consists in calculating the ratio RF between the width PL and the height PH of the image part selected in step 100.

Step 120 consists in comparing RF with RR:
if RF is equal to RR, then the reduced image is generated during a step 140 by proceeding with the extraction of the image part selected in step 100,
otherwise the height PH or width PL of the image part selected is modified during a step 130 in such a manner that the ratio between the width and the height of the modified image part is equal to RR.

More precisely in reference to FIG. 4, the step 130 consists in increasing 131 the width of the bounding box if RF is less than RR and in increasing 132 the height of the bounding box if RF is greater than RR. According to one essential characteristic of the invention, the width or height of the bounding box is increased by taking into account the perceptual interest of the pixels of the source image. In reference to FIG. 5, in the case where RF<RR, the increase in width AL of the bounding box is calculated during a step 1310 in the following manner: AL=PL*RR/RF−PL. During a step 1311 and in reference to FIG. 7, an average saliency value is calculated in an additional box RAG, of width AL and height PH, obtained by increasing the width of the bounding box RE to the left. The average saliency SMG of the additional box RAG is calculated as follows:

$$SMG = \frac{1}{nag} * \sum_{P \in RAG} s_P$$

where nag is the number of pixels in the additional box RAG.

In the same manner during a step 1312 and in reference to FIG. 8, an average saliency value is calculated in an additional box RAD, of width AL and height PH, obtained by increasing the width of the bounding box RE to the right. The average saliency SMD of the additional box RAD is calculated as follows:

$$SMD = \frac{1}{nad} * \sum_{P \in RAD} s_P$$

where nad is the number of pixels in the additional box RAD. Namely nad=nag.

During a step 1313, an overall average saliency value SMT is calculated as follows: SMT=SMG+SMD.

During a step 1314, the increase ALG in width to the left is calculated as follows:

$$ALG=SMG*AL/SMT$$

Likewise, during a step 1315, the increase ALD in width to the right is calculated as follows:

$$ALD=SMD*AL/SMT$$

The modified bounding box REM is shown in FIG. 9. It has a height equal to PH and a width equal to ALG+ALD+PL, i.e. equal to AL+PL. Hence, the ratio between the width and the height of the modified bounding box REM is equal to (AL+PL)/PH, i.e. equal to PL*RR/(RF*PH)=RR.

In reference to FIG. 6, in the case where RF>RR, the increase in height AH of the bounding box is calculated during a step 1320 in the following manner: AH=PH*RF/RR−PH. During a step 1321 and in reference to FIG. 10, an average saliency value is calculated in an additional box RAH, of width PL and height AH, obtained by increasing the height of the bounding box RE upward. The average saliency SMH of the additional box RAH is calculated as follows:

$$SMH = \frac{1}{nah} * \sum_{P \in RAH} s_P$$

where nah is the number of pixels in the additional box RAH.

In the same manner during a step 1322 and in reference to FIG. 11, an average saliency value is calculated in an additional box RAB, of width PL and height AH, obtained by increasing the height of the bounding box RE downward. The average saliency SMB of the additional box RAB is calculated as follows:

$$SMB = \frac{1}{nab} * \sum_{P \in RAB} s_P$$

where nab is the number of pixels in the additional box RAB. Namely nab=nah.

During a step 1323, an overall average saliency value SMT is calculated as follows: SMT=SMB+SMH.

During a step 1324, the increase AHH in height upwards is calculated as follows:

$$AHH=SMH*AH/SMT$$

Likewise, during a step 1325, the increase AHB in height downward is calculated as follows:

$$AHB=SMB*AH/SMT$$

The modified bounding box REM is shown in FIG. 12. It has a height equal AHH+AHB+PH, i.e. equal to AH+PH and a width equal to PL. Hence, the ratio between the width and the height of the modified bounding box REM is equal to PL/(AH+PH), i.e. equal to PL/(PH*RF/RR)=RR.

The step 140 consists in generating the reduced image by extracting, from the source image, the image part delimited by the modified bounding box REM.

Advantageously according to the invention, the bounding box is modified to obtain a box whose ratio between the width and height is equal to the ratio RR such that the modified bounding box REM comprises pixels for which the perceptual interest is high.

In the case where the bounding box RE determined in the step 100 is situated near one of the edges of the source image, it is possible that the additional boxes leave the source image. In this case, during the determination step of the modified bounding box REM, the pixels located outside of the source image are placed on the opposite side.

According to a particular embodiment of the invention illustrated by FIG. 15, the method is applied to each image of a video to generate a video of reduced size. Advantageously, it further comprises a temporal adaptation step 135 applied before the step 140. It consists in temporally adapting the modified bounding box $REM_t$ in an image of index t from the modified bounding box itself temporally adapted, noted $AREM_{t-1}$, in the image of index t−1 temporally preceding the image of index t. This step advantageously enables jerky effects between consecutive images to be prevented, these effects being due to the strong variations from one source image to another of the location of the modified bounding window REM. It notable enables the observer to be given the impression of fluidity during the playing of the reduced video. In reference to FIG. 13, it should be noted that dg (respectively dd) is the distance that separates the left side (respectively right side) of the modified bounding box $REM_t$ of the current image of index t and the left side (respectively right side) of the temporally adapted modified bounding box $AREM_{t-1}$, of the previous image of index t−1. It should also be noted that dh (respectively db) is the distance that separates the top side (respectively bottom side) of the modified bounding box $REM_t$ of the image of index t and the top side (respectively bottom side) of the temporally adapted modified bounding box $AREM_{t-1}$, of the previous image of index t−1.

The distances dd, dg, dh and db are modified in the following manner:

if dd>THD, then ddm=dd−dd/$\alpha_{cv}$, otherwise ddm=dd,
if dg>THD, then dgm=dg−dg/$\alpha_{cv}$, otherwise dgm=dg,
if dh>THD, then dhm=dh−dh/$\alpha_{cv}$, otherwise dhm=dh, and
if db>THD, then dbm=db−db/$\alpha_{cv}$, otherwise dbm=db, According to a variant, the distances dd, dg, dh and db are modified in the following manner:

If (dd AND dg AND dh AND db)>THD, then:

$$ddm=dd-dd/\alpha_{cv}, dgm=dg-dg/\alpha_{cv}, dhm=dh-dh/\alpha_{cv}$$
$$\text{and } dbm=db-db/\alpha_{cv}$$

where "AND" is the "logical AND" operator.

THD is a predefined threshold. For a sequence of images in the CIF format, TDH=20. ddm, dgm, dhm and dbm are the modified values de dd, dg, dh and db respectively. $\alpha_{cv}$ is the temporal convergence speed. If $\alpha_{cv}$ is large then the position of the window $AREM_t$ changes little with respect to the position of the window $AREM_{t-1}$. The sides of the modified bounding box $REM_t$ are then moved in such a manner that the distance that separates the left side (respectively right side) of the temporally adapted modified bounding box $AREM_t$ of the current image and the left side (respectively right side) of the temporally adapted modified bounding box $AREM_{t-1}$ of the previous image is equal to dgm (respectively ddm) and in such a manner that the distance that separates the top side (respectively bottom side) of the modified bounding box $REM_t$ of the current image and the top side (respectively bottom side) of the temporally adapted modified bounding box $AREM_{t-1}$ is equal to dhm (respectively dbm).

The temporal adaptation step 135 can modify the size of the bounding box. Hence, it may be necessary after this step to reapply the steps 110 to 130 so that the width to height ratio of the bounding box $AREM_t$ is equal to RR.

According to another embodiment of the invention, the temporal adaptation step 135 of the bounding box is carried out per shot. A shot is a group of consecutive images separated by two changes of shot of the other images of the sequence. For this purpose, parameters are extracted from the modified bounding boxes according to steps 110 to 130 in each image of a shot of the sequence. These parameters are the coordinates (Cx, Cy) of the centre of the modified bounding box REM, its height H and its width L. A temporal median filter of length N is applied to several images. It consists in sorting the values of each of the parameters according to an increasing order and in selecting the median value. In the case where the number of values is even, then the average of the two values of the middle is chosen. A calculation example is given for a filter of length N=9. The median is calculated for each parameter associated with the REM of the image of index t from the values of parameters associated with the 3 images preceding the image of index t and with the 3 images following the image of index t and listed in the table below:

| parameter | t − 4 | t − 3 | t − 2 | t − 1 | t | t + 1 | t + 2 | t + 3 | t + 4 |
|---|---|---|---|---|---|---|---|---|---|
| Cx | 227 | 231 | 235 | 231 | 233 | 230 | 227 | 230 | 236 |
| Cy | 172 | 157 | 179 | 179 | 185 | 179 | 166 | 168 | 161 |
| W  | 228 | 241 | 159 | 158 | 152 | 163 | 180 | 152 | 152 |
| H  | 197 | 198 | 131 | 130 | 125 | 134 | 148 | 125 | 125 |

The values of the parameter Cx classed in increasing order are the following: 227, 227, 230, 230, 231, 231, 233, 235 and 236.

The median value is the value 231 that is then the new value of Cx for the temporally adapted bounding box of the image of index t ($AREM_t$).

The median values for the other parameters are as follows:

Cy=172, L=159, and H=131.

In the image of index t, the bounding box after filtering is therefore the box centred on the pixel of coordinates (231, 172) of width 159 pixels and of height 131 pixels. The parameters thus modified for each bounding box are more correlated between each other, providing an increase in temporal coherence (or reducing the inter-image jerks).

Naturally, for the N/2 first and N/2 last images of the shot, is it not possible to apply the median filtering as is. In this case, the median of the N first images of the shot (respectively the N last images of the shot) is applied. For example, if N=9, the parameters (Cx, Cy, L, H) of the bounding boxes of the 4 first images of the shot are the same. The value of each parameter is equal to the median value obtained by median filtering of the 9 first values of the corresponding parameter of the shot.

Of course, the invention is not limited to the embodiment examples mentioned above. In particular, the person skilled in the art may apply any variant to the stated embodiments and combine them to benefit from their various advantages.

The method described can be used for many applications such as the summary of a sequence of images, navigation, indexation of image sequences. The invention can also be used to improve the viewing of images or sequences of images on small screens such as PDA, mobile phone or digital camera screens.

What is claimed is:

1. An image processing method to generate, from a source image, an image of reduced size, called reduced image, whose ratio between the width and the height is equal to a predetermined value, called reduced ratio (RR), the method comprising:

selecting one rectangular image part in said source image,
extracting said rectangular image part to generate said reduced image, wherein, when the ratio between the width and height of said rectangular image part, called first ratio, is not equal to the reduced ratio, the width or the height of said rectangular image part is increased before the extracting by a first value on one first side of said image part and by a second value on one second side of said image part opposite to said first side, said first and second values being determined by:

calculating a first increase in width or height such that the ratio between said width and said height of said rectangular image part modified by said first increase is equal to said reduced ratio, calculating a first average saliency value from the values of perceptual interest associated with the pixels of the additional image part obtained by increasing the width or height of said rectangular image part of said first increase to said first side, calculating a second average saliency value from the values of perceptual interest associated with the pixels of the additional image part obtained by increasing the width or height of said rectangular image part of said first increase to said second side, calculating said first value as being the product of said first increase and the ratio between said first average saliency value and the sum of said first and second average saliency values, called total average saliency value, and calculating said second value as being the product of said first increase and the ratio between said second average saliency value and said total average saliency value.

2. The method according to claim 1, wherein when said first ratio is less than said reduced ratio, the width of said rectangular image part is increased by said first value to the right and by said second value to the left.

3. The method according to claim 1, wherein when said first ratio is greater than said reduced ratio, the height of said rectangular image part is increased by said first value upward and by said second value downward.

4. The method according to claim 1, wherein said source image belonging to a sequence of several images, said method is applied to each image of the sequence and comprises, after the increasing the width or height of the rectangular image part of a current image, temporally adapting said rectangular image part consisting in moving at least one of the sides of said rectangular image part if said side is separated from the corresponding side of the rectangular image part of the image that precedes said current image by a distance greater than a predetermined threshold such that said distance is reduced.

5. The method according to claim 1, wherein said source image belonging to a sequence of several images, said method is applied to each image of the sequence and comprises, after the increasing the width or height of the rectangular image part of a current image, temporally adapting said rectangular image part consisting in moving all the sides of said rectangular image part if each one of said sides is separated from the corresponding side of the rectangular image part of the image that precedes said current image by a distance greater than a predetermined threshold such that said distances are reduced.

6. The method according to claim 1, wherein said source image belonging to a sequence of several images, said method is applied to each image of the sequence and comprises, after the increasing the width or height of the rectangular image part of a current image, temporally adapting said rectangular image part consisting in modifying at least one parameter of said rectangular image part among the following parameters: the height, width and coordinates of the centre such that said modified parameter is equal to the median value of the set of values comprising the corresponding parameters of the rectangular image parts of the N images preceding said current image and the N' images following said current image, with N and N' being positive integers.

7. The method according to claim 6, wherein N=N'.

8. The method according to claim 6, wherein said sequence being divided into groups of images called shots, said N images preceding said current image and said N' images following said current image belong to the same shot as said current image.

9. The method according to claim 4, wherein if the ratio between the width and height of said temporally adapted rectangular image part is not equal to said reduced ratio, the temporally adapting is followed by an increasing the width or the height of said temporally adapted rectangular image part according to values of perceptual interest associated with each pixel of said current source image such that the ratio between the width and the height of said temporally adapted and increased rectangular image part is equal to said reduced ratio.

* * * * *